Jan. 23, 1923.
W. H. BRADSHAW.
ENDLESS BELT AND METHOD OF MAKING SAME.
FILED MAY 23, 1921.
1,442,922.
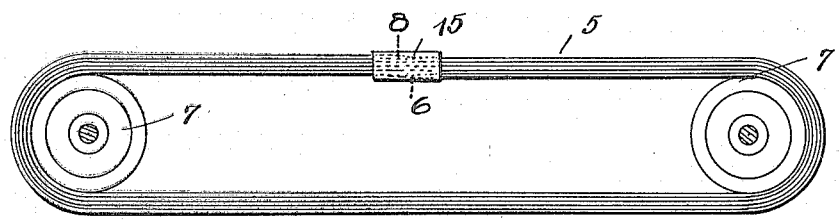
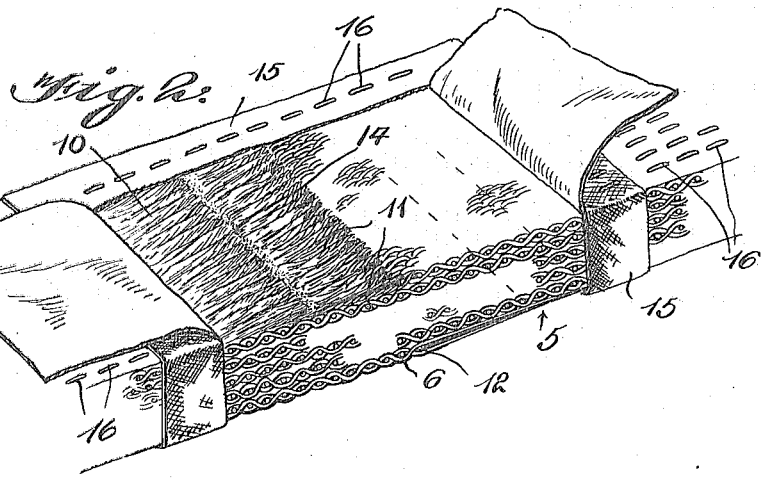
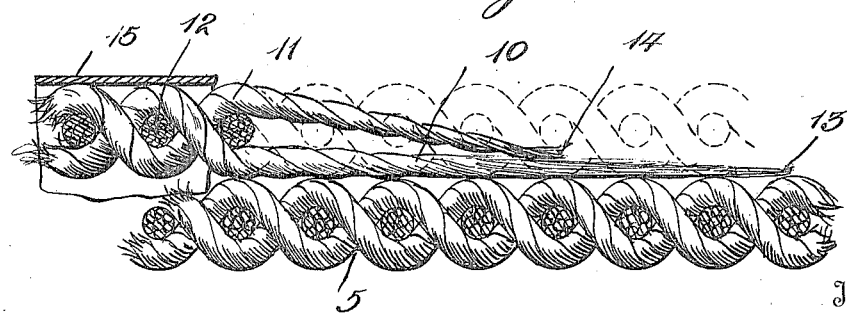
Inventor
W. H. Bradshaw
By Browne & Phelps
Attorneys Patented Jan. 23, 1923.

1,442,922

UNITED STATES PATENT OFFICE.

WILLIAM H. BRADSHAW, OF LANSDOWNE, PENNSYLVANIA, ASSIGNOR TO MAIN BELTING COMPANY, OF PHILADELPHIA, PENNSYLVANIA, A CORPORATION OF PENNSYLVANIA.

ENDLESS BELT AND METHOD OF MAKING SAME.

Application filed May 23, 1921. Serial No. 471,685.

*To all whom it may concern:*

Be it known that I, WILLIAM H. BRADSHAW, a citizen of the United States, residing at Lansdowne, in the county of Delaware and State of Pennsylvania, have invented certain new and useful Improvements in Endless Belts and Methods of Making Same, of which the following is a specification.

This invention relates to improvements in belts and the method of making same and more particularly to improvements in that type of endless belts made of a plurality of plies of fabric.

As is well known to those skilled in the art belts for power purposes have long been made of a plurality of superimposed plies of fabric such as canvas, stitched together longitudinally and otherwise treated or impregnated with the intention of making a durable, reliable and efficient belt for this purpose. There has always, however, been a serious difficulty in securing the ends of these belts to prevent premature breaking at this point and various ways and means have been attempted without complete success. Sometimes the threads of the belt cut away near or at the point of connection, before the body portion of the belt was worn out. Belt fasteners were, therefore, discarded in certain types and it has been attempted to secure the adjacent ends of the belt by overlapping or inter-meshing several plies of the fabric before stitching, but such has almost invariably left a sharp edge of one ply in contact with the adjacent smooth surface of the next ply producing a slight ridge which under the relative bending action of the belt in passing about a pulley caused an abnormal amount of wear upon the smooth adjacent surface thus breaking the fabric along the line of contact, and this constant pounding force in time was transmitted through the next adjacent ply until the entire belt broke away.

The present invention is intended to overcome this main objection, among others, by producing a substantially smooth joint or connection between the adjacent ends of a belt whereby the ridge heretofore formed by the termination of one of the plies of the fabric is eliminated so far as possible and the finished product constitutes a substantially smooth even joint, free from ridges or projections tending to produce the objectionable cracks or breaks above referred to.

A further object is to provide a belt of the endless, superimposed multi-ply type which may be inexpensively manufactured and which will be more durable than belts of this type now in use.

A further object is to provide an improved method of connecting the adjacent ends of fabric belts to produce an endless belt of the above type.

Further objects will be in part obvious and in part hereinafter pointed out.

In the accompanying sheet of drawings forming a part of this disclosure, there is illustrated diagrammatically a preferred embodiment of the invention.

Figure 1 shows diagrammatically the manner of making the belt from a single strip of canvas;

Figure 2 is an enlarged diagrammatic perspective view showing in section the belt join; and Figure 3 is a diagrammatic detail view.

Referring now to the drawings in detail, a single strip of fabric or canvas 5, starting at the point 6 is wound around two spaced members or pulleys 7 at a predetermined distance the desired number of times to make a four or five ply belt as required. The opposite end 8 terminates slightly beyond the end 6.

The present invention resides more particularly in the type of joint or connection which is shown more clearly in Figure 2, where the several plies are indicated by the numeral 5, the beginning of the strip at 6 and ending at 8 as shown in Figure 1. This fabric is shown greatly enlarged and diagrammatically in cross-section and each ply has longitudinally disposed woven threads 10 and 11, and transverse filler threads 12. The ends 6 and 8 are brought into slightly overlapping position and the filler threads 12 removed or unraveled for some distance back from the extreme edge of the ply indicated at 13, thus making what might be termed a fringe formed by the free ends of the longitudinal threads 10 and 11. The upper threads 11 are separated from the lower threads 10 as indicated at the top of Figure 2 and cut off along the line 14 and the extreme ends of both upper and lower threads 10 and 11 combed or carded out to make a smooth gradual decreasing end of the ply as shown in the greatly enlarged detail view Figure 3. The lower ply or opposite end 6 of the strip is, of course, finished in exactly the same way, and in this manner any relatively sharp edge or ridge which would otherwise be produced by the abrupt termination of any ply is obviously eliminated and consequently there can be no pounding or severe blow transmitted from the upper plies to the lower plies as the belt passes about the pulley.

After the ends are brought together and cut and treated in the manner above described a relatively thin wrapper or piece of fabric 15 is wound transversely about the belt at the point of connection and then stitched down by longitudinal rows of stitching 16 which securely hold the belt ends in position and the frayed ends of the longitudinal strands of the fabric in place. Thus, when the belt passes about the pulley it is almost impossible to detect the point of connection due to the gradual tapering of the terminating ends of the single fabric forming the belt.

It is believed from the above description when taken in connection with the accompanying drawings that one skilled in the art will have no difficulty in fully understanding the construction and method of making a belt of this character. The belt is of simple and practical construction and far more durable than any belts now in use so far as known.

I claim as my invention:

1. A belt of the character described comprising a strip wound to form a plurality of plies with overlapping ends, said ends being tapered longitudinally by removing the transverse filler threads and fraying the ends of the longitudinal threads in longitudinal relation, and a wrapper wound about said overlapping ends.

2. A belt of the character described comprising a strip of fabric wound to form a plurality of plies with overlapping ends, said ends being tapered longitudinally by removing the transverse filler threads and fraying the ends of the longitudinal threads in longitudinal relation, and a wrapper of material similar to said strip wound about said overlapping ends, said wrapper and plies all being stitched together longitudinally.

3. The herein described method of making endless belts which consists of the steps of bringing the ends of a continuous strip of fabric into overlapping relation, fraying out the ends of said strip in a longitudinal direction, and securing said ends in place, by winding a strip of thin fabric about the belt transversely and securing the strip and plies together.

4. The herein described method of making endless belts which consists of the steps of bringing the ends of a continuous strip of fabric into overlapping relation, fraying out the ends of said strip by removing the transverse strands and combing out the longitudinal strands and cutting them off at different lengths thereby to make a gradual tapering overlapping joint, and winding a wrapper transversely about said overlapping ends.

In testimony whereof I affix my signature.

WILLIAM H. BRADSHAW.